S. S. RIGBY.
SELF LUBRICATING WHEEL.
APPLICATION FILED MAR. 14, 1911.
998,395.
Patented July 18, 1911.
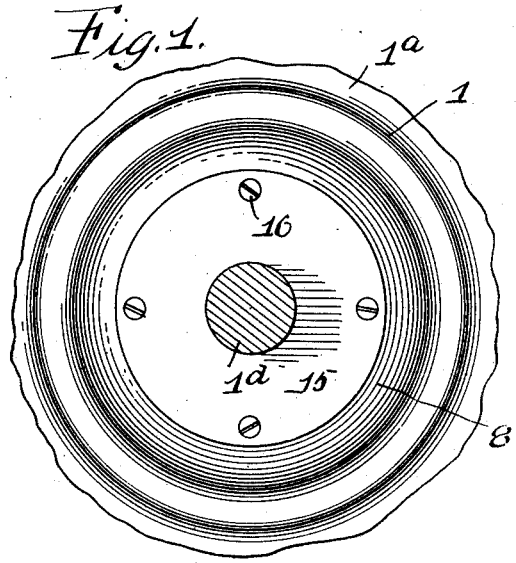
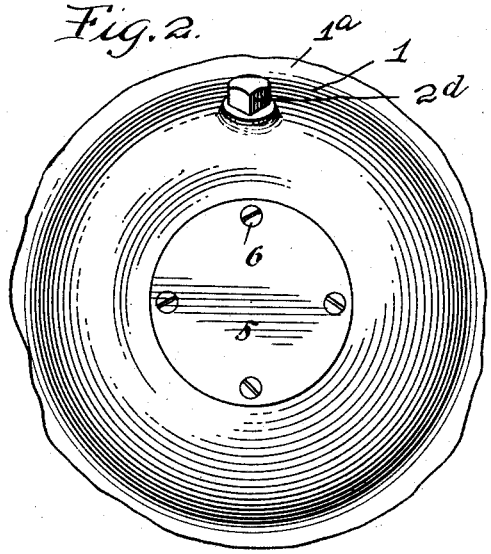
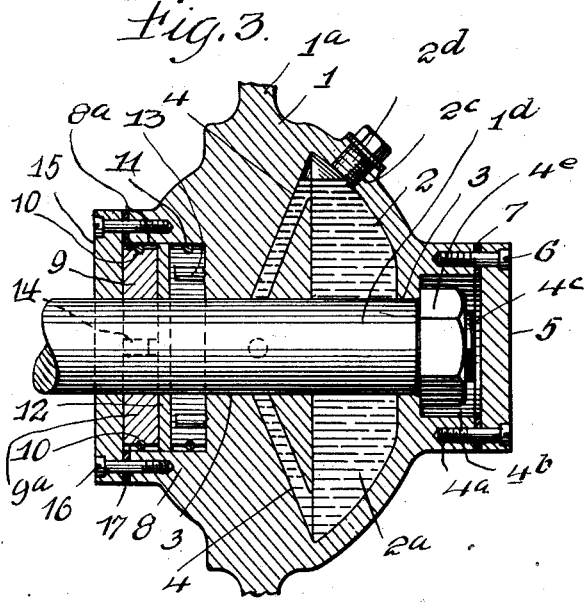
WITNESSES
Samuel Payne
K. H. Butler
INVENTOR
S. S. Rigby
by
Attorneys.

UNITED STATES PATENT OFFICE.

SAMUEL S. RIGBY, OF NEW CASTLE, PENNSYLVANIA.

SELF-LUBRICATING WHEEL.

998,395. Specification of Letters Patent. Patented July 18, 1911.

Application filed March 14, 1911. Serial No. 614,407.

*To all whom it may concern:*

Be it known that I, SAMUEL S. RIGBY, a citizen of the United States of America, residing at New Castle, in the county of Lawrence and State of Pennsylvania, have invented certain new and useful Improvements in Self-Lubricating Wheels, of which the following is a specification, reference being had therein to the accompanying drawing.

This invention relates to self-lubricating wheels and has for its object to provide a wheel of such class for use in connection with pit cars or other vehicles.

Further objects of the invention are to provide a self-lubricating wheel which is comparatively simple in its construction and arrangement, strong, durable, efficient in its use, and comparatively inexpensive to manufacture.

With the foregoing and other objects in view, the invention consists of the novel construction, combination and arrangement of parts as hereinafter more specifically described and illustrated in the accompanying drawings wherein is shown the preferred embodiment of the invention, but it is to be understood that changes, variations and modifications can be resorted to which come within the scope of the claims hereunto appended.

In the drawings wherein like reference characters denote corresponding parts throughout the several views: Figure 1 is a side elevation, broken away, of a self-lubricating wheel in accordance with this invention looking toward the inner side of the wheel, the wheel being shown as mounted upon the axle spindle, the latter being in section. Fig. 2 is a side elevation of the wheel looking toward the outer side thereof, the wheel being broken away. Fig. 3 is a longitudinal sectional view through the hub of the wheel, the remaining portion of the wheel being broken away. Fig. 4 is a detail illustrating a cap plate for the inner side of the hub. Fig. 5 is a detail broken away, illustrating the packing ring, and, Fig. 6 is a detail illustrating the packing wires.

Referring to the drawings in detail, 1 denotes the hub of the wheel which is constructed of suitable metallic material and has formed integral therewith the spokes $1^a$, these latter being broken away. The hub 1 is formed with a centrally-disposed longitudinal opening 3 for the axle spindle $1^d$. The hub 1 is furthermore provided with a recessed portion 2 which constitutes a reservoir containing a body of lubricant $2^a$. A series of channels 4 are provided in the hub 1 which establish communication between the outer portion of the reservoir 2 and the longitudinal opening 3. The channels 4 are disposed at an inclination and supply lubricant from the reservoir 2 against the axle spindle 3. The hub 1 is provided with a filling opening $2^c$ closed by a removable plug $2^d$.

At the outer side of the hub 1 is arranged an annular flange $4^a$ which provides a chamber $4^b$ into which extends the reduced screw threaded end $4^c$ of the spindle $1^d$. Mounted upon the reduced end $4^c$ of the spindle $1^d$ is an axle nut $4^e$ which is of a diameter less than the diameter of the compartment or chamber $4^b$ but of such diameter as to abut against the inner wall of said compartment $4^b$ whereby the hub 1 is retained upon the spindle $1^d$ so that the wheel will not slip outwardly off the spindle. The compartment $4^b$ is closed by a cap plate 5 retained in position through the medium of the hold-fast devices 6, as shown, countersunk screws. Interposed between the cap plate 5 and the flange $4^a$ is a washer 7. The inner side of the hub 1 is provided with an inwardly-extending annular flange 8 which is of greater diameter than the flange $4^a$ and which provides a chamber or compartment $8^a$ for the reception of packing elements. The compartment $8^a$ is closed through the medium of a cap plate 15 which is maintained in position by the hold-fast devices 16. A washer 17 is interposed between the cap plate 15 and the flange 8.

Arranged within the chamber $8^a$ is an inner and an outer packing ring, each of said rings being formed of two sections 9 and $9^a$. The sections of each ring are peripherally grooved as at 10 and mounted in the grooves of each section of a ring and surrounding the ring is a retaining wire 11 which is of a diameter as to abut against the wall of the chamber $8^a$. The inner wall of the chamber $8^a$ is provided with a pair of pins 13 which extend between the sections of the inner packing ring and the cap plate 15 is provided with inwardly-extending pins 14 which project between the sections of the outer packing ring. Interposed between the inner and outer packing rings and of a diameter as to engage the wall of the chamber 8ª is a washer 12.

The packing rings can be made of any suitable packing material, such as felt or leather and these rings prevent the lubricant from escaping from the inner side of the hub.

What I claim is:

1. A self-lubricating wheel including a hub provided with a lubricant reservoir and further provided with channels for establishing communication between the reservoir and the central bore of the hub at a point removed from the reservoir, said hub having its inner side provided with means to constitute a chamber, a cap plate for closing said chamber, a pair of packing rings mounted in the chamber, a washer interposed between the packing rings, each of said packing rings formed of two sections, pins carried by the hub and extending between the sections of one of said packing rings, and pins carried by the cap plate and extending between the sections of the other of said packing rings.

2. A self-lubricating wheel including a hub provided with a lubricant reservoir and further provided with channels for establishing communication between the reservoir and the central bore of the hub at a point removed from the reservoir, said hub having its inner side provided with means to constitute a chamber, a cap plate for closing said chamber, a pair of packing rings mounted in the chamber, a washer interposed between the packing rings, each of said packing rings formed of two sections, pins carried by the hub and extending between the sections of one of said packing rings, pins carried by the cap plate and extending between the sections of the other of said packing rings, and a retaining wire seated in each of said packing rings.

3. A self-lubricating wheel including a hub provided with a lubricant reservoir and further provided with a plurality of inclined channels for establishing communication between the reservoir and the bore of the hub at a point removed from the reservoir, said hub having its outer side provided with means to constitute a compartment for the axle nut, means for closing said compartment, said hub provided at its inner side with means to constitute a chamber, a cap plate for closing said chamber, a pair of packing rings mounted in said chamber, a washer interposed between the packing rings, each of said packing rings formed with two sections, pins carried by the hub and extending between the sections of one of said packing rings, and pins carried by the cap plate and extending between the sections of the other of said packing rings.

4. A self-lubricating wheel including a hub provided with a lubricant reservoir and further provided with a plurality of inclined channels for establishing communication between the reservoir and the bore of the hub at a point removed from the reservoir, said hub having its outer side provided with means to constitute a compartment for the axle nut, means for closing said compartment, said hub provided at its inner side with means to constitute a chamber, a cap plate for closing said chamber, a pair of packing rings mounted in said chamber, a washer interposed between the packing rings, each of said packing rings formed with two sections, pins carried by the hub and extending between the sections of one of said packing rings, pins carried by the cap plate and extending between the sections of the other of said packing rings, and a retaining wire seated in each of said packing rings.

In testimony whereof I affix my signature in the presence of two witnesses.

SAMUEL S. RIGBY.

Witnesses:
MAX H. SROLOVITZ,
CHRISTINA T. HOOD.